US010697386B2

(12) United States Patent
     Moine

(10) Patent No.: US 10,697,386 B2
(45) Date of Patent: Jun. 30, 2020

(54) METHOD AND DEVICE FOR DETERMINING THE AIR FLOW RATE ENTERING THE INTAKE MANIFOLD OF A TWO-STROKE ENGINE

(71) Applicants: Continental Automotive France, Toulouse (FR); Continental Automotive GmbH, Hannover (DE)

(72) Inventor: Xavier Moine, Cugnaux (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 156 days.

(21) Appl. No.: 15/780,404

(22) PCT Filed: Nov. 18, 2016

(86) PCT No.: PCT/EP2016/001927
§ 371 (c)(1),
(2) Date: May 31, 2018

(87) PCT Pub. No.: WO2017/097396
PCT Pub. Date: Jun. 15, 2017

(65) Prior Publication Data
US 2018/0347496 A1    Dec. 6, 2018

(30) Foreign Application Priority Data
Dec. 8, 2015 (FR) ...................... 15 61965

(51) Int. Cl.
     F02D 41/18    (2006.01)
     F02D 41/22    (2006.01)
     (Continued)

(52) U.S. Cl.
     CPC ........... F02D 41/182 (2013.01); F02D 41/14 (2013.01); F02D 41/1401 (2013.01);
     (Continued)

(58) Field of Classification Search
     CPC .... F02D 41/182; F02D 41/14; F02D 41/1401; F02D 41/22; F02D 2400/04;
     (Continued)

(56) References Cited

U.S. PATENT DOCUMENTS 4,920,789 A * 5/1990 Gomez .................... G01F 1/86
                                                    73/114.32
4,920,790 A   5/1990 Stiles et al.
(Continued)

FOREIGN PATENT DOCUMENTS

EP    0420442 A2    4/1991
EP    1280988 B1    11/2006
(Continued)

OTHER PUBLICATIONS

International Search Report and Written Opinion for International Application No. PCT/EP2016/001927, dated Dec. 23, 2016, 8 pages.

*Primary Examiner* — Freddie Kirkland, III
(74) *Attorney, Agent, or Firm* — RatnerPrestia

(57) ABSTRACT

A method for measuring the flow rate MAF of cool air entering an intake manifold of a two-stroke engine, the intake manifold being located between a throttle body and an intake system. The method uses a specific prediction model depending on whether the two-stroke engine is subject, on the one hand, to a light load and, on the other hand, to a medium or heavy load. The model suitable for the load is selected using a predetermined threshold and two absolute pressure measurements taken at the intake manifold at crankshaft angles of rotation around top dead center and bottom dead center. Next, a pressure quotient is formed for each model which will be used to deduce the flow rate of cool air entering the intake manifold.

14 Claims, 2 Drawing Sheets

(51) Int. Cl.
 *F02D 41/14* (2006.01)
 *F02B 75/02* (2006.01)
(52) U.S. Cl.
 CPC ........ *F02D 41/22* (2013.01); *F02B 2075/025* (2013.01); *F02D 2041/1433* (2013.01); *F02D 2200/0406* (2013.01); *F02D 2200/703* (2013.01); *F02D 2400/04* (2013.01); *Y02T 10/40* (2013.01)
(58) Field of Classification Search
 CPC ....... F02D 2200/703; F02D 2200/0406; F02D 2041/1433; Y02T 10/40; F02B 2075/025
 See application file for complete search history.

(56) References Cited

U.S. PATENT DOCUMENTS

| | | | |
|---|---|---|---|
| 4,987,773 A | 1/1991 | Stiles et al. | |
| 5,134,984 A | 8/1992 | Nonaka et al. | |
| 5,215,068 A | 6/1993 | Kato | |
| 5,284,118 A | 2/1994 | Kato et al. | |
| 5,404,843 A | 4/1995 | Kato | |
| 5,408,872 A | 4/1995 | Nonaka | |
| 6,782,738 B2 * | 8/2004 | Rouphael | G01M 15/09 73/114.33 |
| 6,889,664 B2 * | 5/2005 | Worth | F02D 41/18 123/494 |
| 7,536,983 B2 * | 5/2009 | Layher | F02B 33/04 123/73 B |
| 7,621,176 B2 * | 11/2009 | Layher | F02B 77/085 73/115.01 |
| 2003/0154777 A1 | 8/2003 | Worth et al. | |
| 2003/0182995 A1 | 10/2003 | Rouphael | |
| 2007/0163557 A1 * | 7/2007 | Layher | F02B 33/04 123/73 PP |
| 2008/0041144 A1 * | 2/2008 | Layher | F02B 77/085 73/115.01 |

FOREIGN PATENT DOCUMENTS

| | | |
|---|---|---|
| EP | 1956211 A2 | 8/2008 |
| FR | 2837923 A1 | 10/2003 |
| GB | 2221722 B | 2/1990 |
| GB | 2221774 B | 2/1990 |
| GB | 2222004 B | 2/1990 |
| JP | 02233840 A | 9/1990 |
| JP | 03117645 A | 5/1991 |
| JP | 04101041 A | 4/1992 |
| JP | 0518287 A | 1/1993 |
| JP | 05163974 A | 6/1993 |
| JP | 05248295 A | 9/1993 |
| JP | 06010741 A | 1/1994 |
| JP | 06137181 A | 5/1994 |
| JP | 06146947 A | 5/1994 |
| JP | 0874609 A | 3/1996 |
| JP | 2012172591 A | 9/2012 |
| JP | 2014224484 A | 12/2014 |
| WO | 0183970 A1 | 11/2001 |

* cited by examiner

METHOD AND DEVICE FOR DETERMINING THE AIR FLOW RATE ENTERING THE INTAKE MANIFOLD OF A TWO-STROKE ENGINE

CROSS REFERENCE TO RELATED APPLICATIONS

This application is the U.S. National Phase Application of PCT International Application No. PCT/EP2016/001927, filed Nov. 18, 2016, which claims priority to French Patent Application No. 1561965, filed Dec. 8, 2015, the contents of such applications being incorporated by reference herein.

FIELD OF THE INVENTION

The invention primarily relates to a method for determining the flow rate of cool air entering the intake manifold of a two-stroke engine.

The invention also pertains to a device for implementing such a method.

BACKGROUND OF THE INVENTION

It is known practice to control the fuel injection of an internal combustion engine using an electronic control system which calculates and controls the flow rate of the various fuel injectors on the basis of the values taken by a certain number of operating parameters of the engine.

The information required for controlling the injectors includes the mass of cool air taken into the cylinders of the engine. This air mass directly determines the amount of fuel to be injected, the ratio of the air mass to the amount of fuel effectively being predefined for a given engine.

The mass of cool air taken into the cylinders of an internal combustion engine is however difficult to measure directly such that values of more accessible parameters which allow the approximately accurate value of this air mass to be recalculated on the basis of the laws of fluid mechanics and thermodynamics are conventionally used.

For example, patent EP 1 280 988 B1 which is incorporated by reference, provides a method for determining the air flow rate on the basis of the atmospheric pressure and the absolute pressure at the manifold measured in the intake manifold for a given crankshaft angle.

The accuracy of this method is entirely acceptable for four-stroke engines, but less so for two-stroke engines.

Specifically, it has been shown for two-stroke engines that a nonlinearity exists between the absolute pressure measured at the manifold and the engine load. The method according to patent EP 1 280 988 B1 therefore cannot be applied reliably for all of the loads to which a two-stroke engine may be subject. More specifically, in a two-stroke engine with a light load, the values of absolute pressure measured at the intake manifold are subject to substantial interference due to the combustion conditions which are more finely balanced than in a four-stroke engine.

It is known common practice to use an air flow meter to evaluate the mass of air delivered to a two-stroke engine. However, the use of a flow meter is too expensive a solution.

SUMMARY OF THE INVENTION

An aspect of the present invention aims to overcome, or at least to alleviate, all or some of the limitations of the solutions of the prior art, in particular those discussed above, by providing a solution which allows the air flow rate of a two-stroke engine to be measured on the basis of measurements of absolute pressure at the manifold in the intake manifold for all of the loads to which a two-stroke engine may be subject.

The inventor has conducted experiments which have led him to identify correlations between the absolute pressure measured at the manifold and the mass of cool air entering the intake manifold. These experiments have also led him to observe that these correlations were not the same depending on whether the two-stroke engine is subject, on the one hand, to a light load and, on the other hand, to a medium or heavy load. The inventor has therefore implemented a method for determining the flow rate of air entering the intake manifold of a two-stroke engine on the basis of these observations.

To this end, a first aspect of the invention provides a method for measuring the flow rate of cool air entering an intake manifold of a two-stroke engine, the intake manifold being located between a throttle body and an intake system, such as a piston skirt, valve or rotary valve intake. The method comprises the steps consisting in:

selecting a first and a second predetermined crankshaft angle of rotation at which the absolute pressure at the manifold in the intake manifold must be acquired;
  acquiring a first absolute pressure at the manifold in the intake manifold at the first predetermined crankshaft angle of rotation around top dead center;
  acquiring a second absolute pressure at the manifold in the intake manifold at the second predetermined crankshaft angle of rotation around bottom dead center;
  detecting whether the engine is operating below or above a predetermined load threshold according to the first absolute pressure value, the second absolute pressure value and the atmospheric pressure;

and when the engine is operating below the predetermined load threshold:

determining the cool air flow rate in the intake manifold on the basis of a predetermined characteristic straight line describing at least one linear relationship between, on the one hand, the increase in pressure in the intake manifold between top dead center, and bottom dead center and, on the other hand, a measured amount of cool air flowing between the throttle body and the intake system when the intake system is closed.

This has the advantage of simplicity, since the method makes it possible to apply a suitable predetermined model to the load of the two-stroke engine, and do so on the basis of only two measurements of absolute pressure at the intake manifold. The use of a flow meter is not necessary and the estimate of the air flow rate is accurate, since it is adapted to the load of the two-stroke engine.

In a first implementation, the method includes the step consisting in determining the predetermined load threshold on the basis of the first absolute pressure and the second absolute pressure, for a given engine speed. This implementation makes it possible to obtain a simple estimate of the load of the two-stroke engine. Moreover, since this implementation is not based on information on the angle at the throttle body, it may be used in the event of lack of throttle angle information.

In a second implementation, the method includes the steps consisting in:

forming a first quotient on the basis of the first absolute pressure and the atmospheric pressure;
  forming a second quotient on the basis of the second absolute pressure and the atmospheric pressure; and detecting whether the engine is operating below or above a predetermined load threshold on the basis of the first quotient and the second quotient.

This has the advantage of efficiency since the quotients depend on the atmospheric pressure such that an aspect of the invention may also be implemented at altitude with little or no correction.

In one example of the second implementation, when the engine is operating below the predetermined load threshold, the method includes the steps consisting in:

forming a third quotient on the basis of the first quotient and the second quotient; and determining, for a given engine speed, the cool air flow rate in the intake manifold on the basis of the predetermined characteristic straight line describing at least one linear relationship between, on the one hand, the third quotient and, on the other hand, a measured amount of cool air flowing between the throttle body and the intake system when the intake system is closed.

In another example of the second implementation, when the engine is operating above the predetermined load threshold, the method includes the step consisting in determining, for a given engine speed, the cool air flow rate in the intake manifold on the basis of a predetermined characteristic curve describing a relationship between, on the one hand, the first quotient and, on the other hand, a measured amount of cool air flowing between the throttle body and the intake system when the intake system is closed.

In a third implementation, the method includes the step consisting in selecting the first and the second predetermined crankshaft angle of rotation within a range of roughly 30 degrees.

In one example of the third implementation, the method includes the step consisting in:

selecting the first and the second predetermined crankshaft angle of rotation within a range of roughly 30 degrees, preferably at 30 degrees for the first predetermined angle and at 180 degrees for the second predetermined angle. These values have been measured as being relevant for two-stroke engines.

In a second aspect, the invention relates to a method for improving an electronic control module intended for use with a two-stroke engine having an intake manifold located between a throttle body and an intake system, the intake manifold having a pressure sensor. The improvement method is characterized in that it comprises a step of measuring the flow rate of cool air entering the intake manifold according to a method according to the first aspect.

In a third aspect, the invention also relates to an electronic control module (or ECU, for engine control unit) intended for use with a two-stroke engine having an intake manifold located between a throttle body and an intake system, the intake manifold having a pressure sensor, the electronic control module being suitable for measuring the flow rate of cool air entering the intake manifold according to a method according to the first aspect.

A fourth aspect of the invention relates to a vehicle including an electronic control module according to the third aspect of the invention.

A fifth aspect of the invention relates to the use of the electronic control module of the third aspect for detecting combustion instability in a two-stroke engine.

Lastly, in a sixth and final aspect, the invention relates to the use of the electronic control module of the third aspect in combination with a method or a device that is suitable for determining the cool air flow rate in the manifold on the basis of information on the angle at the throttle body, for detecting a malfunction in the air line of a two-stroke engine.

BRIEF DESCRIPTION OF THE DRAWINGS

Other features and advantages of aspects of the invention will become apparent upon reading the description that will follow. This description is purely illustrative and should be read with reference to the appended drawings, in which.

In these figures, identical references from one figure to another denote identical or analogous elements. For the sake of clarity, the elements shown are not to scale in relation to one another, unless indicated otherwise.

DETAILED DESCRIPTION OF THE PREFERRED EMBODIMENTS

Figure 1:
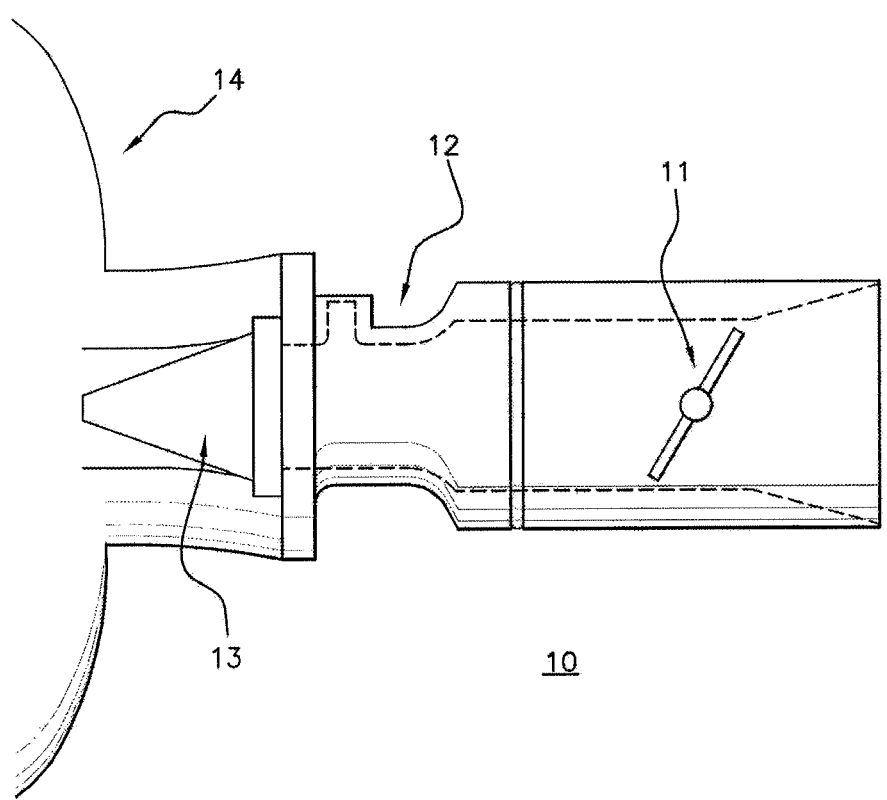
FIG. 1 is a schematic representation of an air intake circuit of a two-stroke engine.

FIG. 1 schematically shows an air intake circuit 10 of known type, for a two-stroke engine (not shown).

As illustrated by FIG. 1, the air intake circuit 10 comprises a valve, referred to as the throttle body 11, positioned between an air filter (not shown) and an intake manifold 12. The throttle body 11 comprises an air intake duct and a generally flat valve, rotatably mounted in the duct. The intake of air into the intake manifold 12 is regulated according to the angular position of the valve in the duct of the throttle body 11. The intake manifold 12 is located between the throttle body 11 and an intake system 13 positioned inside a compression casing 14. For example, the intake system may be a piston skirt, valve or rotary valve intake. The intake manifold 12 comprises an absolute pressure sensor of known type which makes it possible to measure the absolute pressure at the manifold in the intake manifold 12. For example, the pressure sensor may be a pressure sensor such as those used in the intake circuit of four-stroke engines which possess a narrow operating range located below atmospheric pressure.

As mentioned above, the inventor has conducted experiments which have led him to identify, correlations between the absolute pressure measured at the manifold and the mass of cool air entering the intake manifold depending on whether the two-stroke engine is subject, on the one hand, to a light load and, on the other hand, to a medium or heavy load.

Specifically, the set objective consisted in developing a cool air delivery model on the basis of pressure information.

To achieve this, numerous tests have been carried out. In particular, the amount of fuel injected, the ignition advance, the compression ratio of the engine, the position of the inlet and outlet ports and environmental conditions such as temperature have been made to vary. For each of the variations or combinations of variations, the cool air flow rate and the absolute pressure has been measured at multiple locations using a pressure sensor. In particular, the pressure sensor has been positioned downstream of the throttle body 11, in the compression casing 14, in the cylinder of the engine or else in the outlet line.

On the basis of the measurement information described above, the inventor has arrived at the conclusion that a straightforward pressure acquisition does not make it possible to deduce the cool air flow rate correctly since monotonicity is not observed between the measured pressure and the measured cool air flow rate for all of the loads to which a two-stroke engine may be subject.

Based on this observation, the inventor has developed a specific prediction model depending on whether the two-stroke engine is subject, on the one hand, to a light load and, on the other hand, to a medium or heavy load. The model suitable for the load is selected using a predetermined threshold and two absolute pressure measurements taken at the intake manifold at crankshaft angles of rotation around top dead center and bottom dead center. Next, a pressure quotient is formed for each model which will be used to deduce the flow rate of cool air entering the intake manifold 12.

Figure 2:
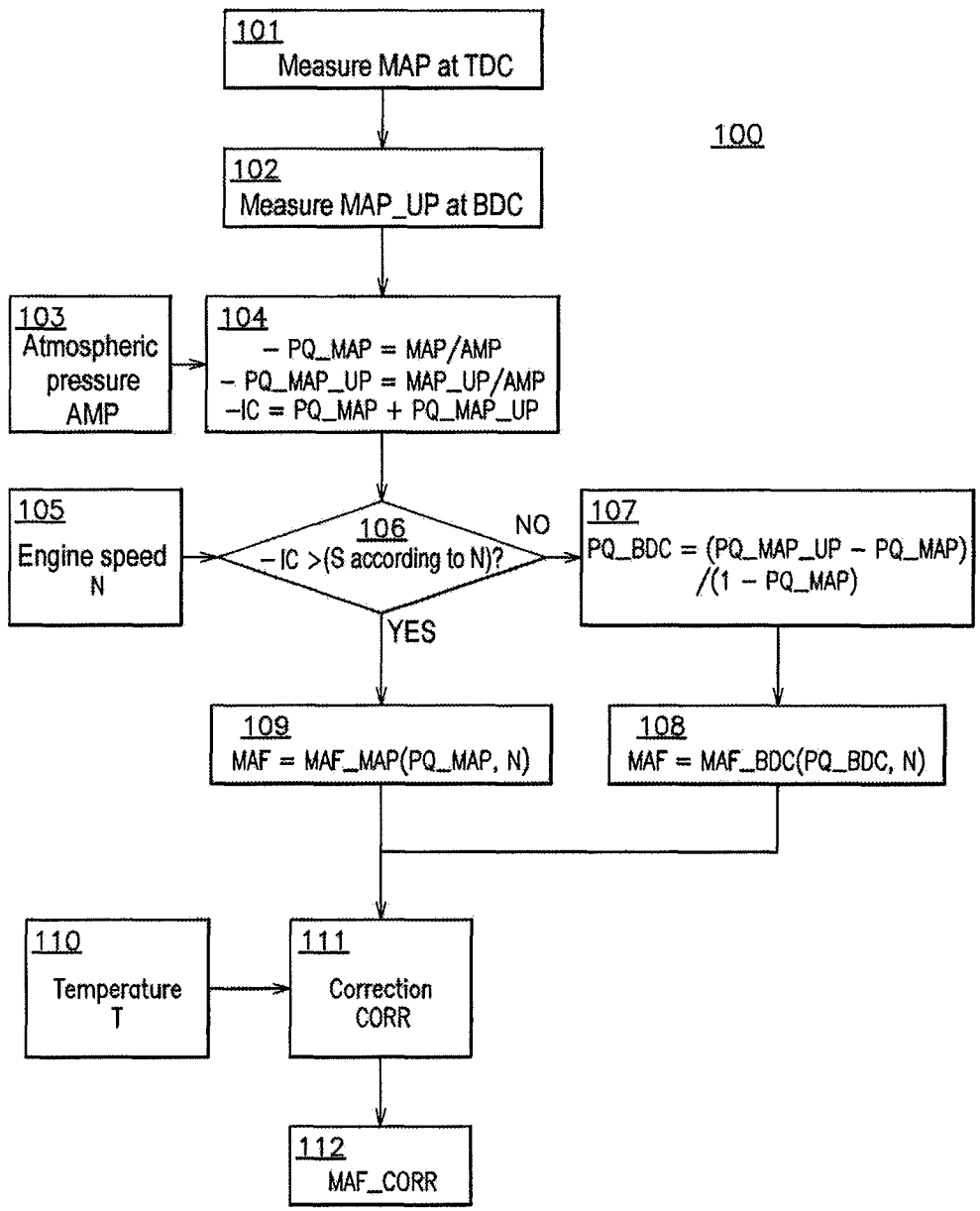
FIG. 2 is a flowchart of steps illustrating modes of implementation of a method for determining the flow rate of air entering the intake manifold of a two-stroke engine according to an aspect of the invention.

FIG. 2 schematically illustrates the main steps of a method 100 for determining the flow rate of air entering the intake manifold 12 of FIG. 1 according to an aspect of the invention. This method is for example implemented in the form of instructions from a computer program stored and run in an electronic control module (not shown).

In step 101, a first absolute pressure value MAP is acquired in the intake manifold 12 at a first predetermined crankshaft angle of rotation around top dead center (TDC). For example, the first predetermined angle is set at an angle of 30° of the crankshaft around TDC.

In step 102, a second absolute pressure value MAP_UP is acquired in the intake manifold 12 at a second predetermined crankshaft angle of rotation around bottom dead center (BDC). For example, the second predetermined angle is set at an angle of 180° of the crankshaft around BDC.

According to an aspect of the invention, the first predetermined crankshaft angle of rotation is selected such that it is different from the second predetermined crankshaft angle of rotation. Additionally, the first predetermined crankshaft angle of rotation and the second predetermined crankshaft angle of rotation may be selected within a range of roughly 30 degrees around TDC or BDC, respectively.

After step 102, in steps 103 and 104, a load state of the two-stroke engine is determined according to the absolute pressure value MAP, the absolute pressure value MAP_UP and the atmospheric pressure AMP.

In step 103, the atmospheric pressure AMP is determined using a method of known type for determining the atmospheric pressure. For example, the atmospheric pressure AMP may be determined on the basis of the absolute pressure value MAP_UP. Specifically, since the signal pressure value MAP_UP is acquired when the crankshaft is at BDC, the signal MAP_UP is representative of the pressure upstream of the throttle body. In one particular implementation, a low-pass filter is used to update the atmospheric pressure AMP, the activation of which is determined by the speed and load parameters (see for example in step 104, the first quotient PQ_AMP) of the engine. The input of the low-pass filter is then the signal absolute pressure value MAP_UP corrected by mapping, the inputs for which are those which allowed the filter to be activated, namely the engine speed and the load. In one example, the correction may be limited to a low value, for example 20 mbar, over many operating points of the engine.

In step 104, a first quotient PQ_MAP is formed on the basis of the values MAP and AMP. For example, the quotient PQ_MAP corresponds to the ratio MAP/AMP. Further in step 104, a second quotient PQ_MAP_UP is formed on the basis of the values MAP_UP and AMP. For example, the quotient PQ_MAP_UP corresponds to the ratio MAP_UP/AMP. Lastly, still in step 104, an indicator of the load IC of the two-stroke engine is determined on the basis of the quotients PQ_MAP and PQ_MAP_UP. For example, the load indicator IC corresponds to the sum of the quotients PQ_MAP and PQ_MAP_UP.

After step 104, in steps 105 and 106, it is determined whether the two-stroke engine is operating below or above a predetermined load threshold S. In the context of an aspect of the invention, the predetermined load threshold S allows the operating mode of the two-stroke engine to be separated into two parts depending on whether it is subject, on the one hand, to a light load and, on the other hand, to a medium or heavy load. Furthermore, the inventor has also found that the predetermined load threshold S varies according to the engine speed N. Thus, the predetermined load threshold S may be different for each engine speed N.

In step 105, the speed N of the two-stroke engine is determined using a method of known type for determining the engine speed. For example, it is possible to use an engine speed sensor of known type or else an engine speed estimator of known type. Furthermore, in step 105, the predetermined load threshold S that corresponds to the engine speed N is determined. For example, the predetermined threshold S for a given engine speed may be determined on the basis of a lookup table previously stored in a memory.

In step 106, it is determined whether the two-stroke engine is operating below or above the threshold S by comparing the load indicator IC with the threshold S.

Next, the method 100 moves on to step 107 when the load indicator IC is below the threshold S and the method 100 moves on to step 109 when the load indicator IC is above the threshold S.

In step 107, a third quotient PQ_BDC is formed on the basis of the quotients PQ_MAP_UP and PQ_MAP. For example, the quotient PQ_BDC corresponds to the ratio (PQ_MAP_UP−PQ_MAP)/(1−PQ_MAP).

In step 108, the cool air flow rate MAF in the intake manifold 12 is determined on the basis of a predetermined characteristic straight line MAF_BDC describing at least one linear relationship between the quotient PQ_BDC and the cool air flow rate at the intake manifold 12. More specifically, the straight line MAF_BDC exhibits a predetermined slope which describes a linear relationship between, on the one hand, the increase in pressure in the intake manifold between top dead center, and bottom dead center and, on the other hand, a measured amount of cool air flowing between the throttle body and the intake system when the intake system is closed. Specifically, the inventor has found that there is a linear correlation between the quotient PQ_BDC and the flow rate MAF when the two-stroke engine is subject to a light load. The inventor has also found that the correlation may be linear in sections. In this case, the predetermined characteristic straight line MAF_BDC is composed of several sections.

In one particular implementation of an aspect of the invention, the increase in pressure in the intake manifold is considered only for a determined area located between TDC and BDC. For example, it is possible to imagine a method based on a pressure measurement at TDC and a measurement of the pressure gradient at 100° after TDC. It would then be possible to obtain a result that is equivalent to the solution such as described.

The correlation described above is due in particular to the particular operation of the two-stroke engine over one complete revolution. Specifically, in a first engine stroke, the piston of the cylinder of the engine is located at top dead center and the bottom crankcase is at its highest volume level. Specifically, at this time, in one example, a valve located at the intake system 13 opens such that the bottom crankcase draws in air from the intake circuit 10. Next, in a second engine stroke, the piston descends to compress the mixture in the bottom crankcase. At the same time, the valve of the intake system closes so that air no longer passes into the bottom crankcase. Thus, between the transition from top dead center to bottom dead center, since the intake system is closed, opening the throttle body will then result in an increase in pressure which allows the amount of cool air entering the intake manifold to be characterized.

Furthermore, the inventor has also found that this correlation depends on the engine speed. Thus, it is possible for example to determine the flow rate MAF for a given engine speed on the basis of a lookup table previously stored in a memory describing the relationship between the quotient PQ_BDC and the flow rate MAF.

In step 109, the cool air flow rate MAF in the intake manifold is determined on the basis of a predetermined characteristic curve MAF_MAP describing a relationship between the quotient PQ_MAP and the cool air flow rate at the intake manifold 12. Specifically, the inventor has found that there is a correlation between the quotient PQ_MAP and the flow rate MAF when the two-stroke engine is subject to a medium or heavy load. Furthermore, the inventor has also found that this correlation depends on the engine speed. Thus, it is possible for example to determine the flow rate MAF for a given engine speed on the basis of a lookup table previously stored in a memory describing the relationship between the quotient PQ_MAP and the flow rate MAF.

Optionally, after steps 108 and 109, the cool air flow rate MAF is corrected on the basis of a temperature T at the intake of the two-stroke engine and the atmospheric pressure AMP. For example, the atmospheric pressure AMP obtained above in step 103 may be used.

In step 110, the temperature T at the cylinder of the two-stroke engine is determined using a method of known type for determining air temperature. For example, a temperature sensor of known type may be used.

In step 111, a correction CORR of the cool air flow rate MAF on the basis of the temperature T and the atmospheric pressure AMP is determined using a correction method. In one implementation of the correction method, a correction CORR(T) for the temperature T is determined on the basis of a predetermined lookup table. Next, a correction CORR_AMP(N, AMP) for the engine speed and the atmospheric pressure is determined on the basis of a predetermined lookup table. In one example CORR(T) is defined by the following formula: CORR(T)=T$^{0.8}$, where T is expressed in kelvin. In another example, the correction CORR_AMP(N, AMP) is equal to zero.

Lastly, in step 112, the corrected cool air flow rate MAF_CORR is determined by applying the correction CORR to the cool air flow rate MAF. In one example, the corrected cool air flow rate MAF_CORR is defined by the following formula:

MAF_CORR=CORR(*T*)*(MAF*AMP+COR_AMP (*N*,AMP)).

The method 100 may be implemented in an electronic control module (ECU, for engine control unit) of a vehicle including a two-stroke engine such as a boat, a snowmobile or else an off-road motorcycle. The electronic control module comprises for example at least one processor and at least one memory in which a computer program is stored. This program comprises a set of program code instructions which, when they are run by the processor, implement the various steps of the method 100 described above. In one variant, the electronic control module includes hardware means such as one or more programmable logic circuits of FPGA, PLD, etc. type, and/or one or more specialized integrated circuits (ASICs) suitable for implementing all or some of the steps of the method 100.

A combination of such hardware means and one or more computer programs is also possible.

In other words, the electronic control module includes a set of means configured as software (specific computer program product) and/or as hardware (FPGA, PLD, ASIC, etc.) to implement method 100.

An aspect of the invention has a number of advantages. For example, the inventor has observed that the variability in the absolute pressure value MAP allows combustion instability in the engine to be deduced therefrom. Thus, when the two-stroke engine is operating with a light load and a deviation in the variation, such as a standard deviation, in the absolute pressure value MAP above a predetermined threshold value is observed, then it would be possible to envisage correcting the richness of the mixture or else the ignition advance so as to stabilize combustion. Moreover, observing the absolute pressure value MAP also makes it possible to detect misfires. Specifically, when there are few misfires, the inventor has observed that the absolute pressure value MAP is relatively stable. Thus, if it is observed that the absolute pressure value MAP varies suddenly, this may be indicative of a misfire, of unstable combustion or of a control correction element. Thus, it is possible to envisage correcting control parameters, for example injection and ignition, when unstable combustion is detected. It is also possible, for example, to increase the injection time, or to increase the ignition advance. It is therefore possible to monitor the appearance of pressure peaks on the basis of the absolute pressure value MAP and to obtain new information on the state of combustion. This is an advantage with respect to that which it is possible to obtain in a four-stroke engine, in which a combustion instability does not necessarily mean a pressure instability.

An aspect of the invention may also be coupled with a method or a device suitable for determining the cool air flow rate in the manifold on the basis of information on the angle at the throttle body. For example an air leak or a malfunction at the outlet valves may be detected if there is a substantial difference between the cool air flow rate obtained according to throttle angle information and the cool air flow rate obtained according to an aspect of the invention. In another example, the lack of throttle angle information may be made up for by the redundant use of an aspect of the invention.

An aspect of the present invention has been described and illustrated in the present detailed description and in the figures of the appended drawings. The present invention is not limited to the embodiments thus presented, however. Other variants and embodiments may be deduced and implemented by a person skilled in the art after reading the present description and examining the appended figures.

In the claims, the term "include" does not exclude other elements or other steps. The indefinite article "a" or "an" does not exclude the plural. A single processor or a plurality of other units may be used to implement an aspect of the invention. The various features described and/or claimed may advantageously be combined. Their presence in the description or in different dependent claims does not exclude the possibility of combining them. Lastly, the reference signs in the figures of the drawings should not be understood as limiting the scope of aspects of the invention.

The invention claimed is:
1. A method for measuring a flow rate of cool air entering an intake manifold of a two-stroke engine, the intake mani- fold being located between a throttle body and an intake system, wherein the method comprising:
- selecting a first and a second predetermined crankshaft angle of rotation at which an absolute pressure at the manifold in the intake manifold must be acquired;
- acquiring a first absolute pressure at the manifold in the intake manifold at a first predetermined crankshaft angle of rotation around top dead center;
- acquiring a second absolute pressure at the manifold in the intake manifold at a second predetermined crankshaft angle of rotation around bottom dead center;
- detecting whether the engine is operating below or above a predetermined load threshold according to the first absolute pressure value, the second absolute pressure value and an atmospheric pressure;
- and when the engine is operating below the predetermined load threshold:
- determining the cool air flow rate in the intake manifold on the basis of a predetermined characteristic straight line describing at least one linear relationship between, on the one hand, an increase in pressure in the intake manifold between top dead center and bottom dead center and, on the other hand, a measured amount of cool air flowing between the throttle body and the intake system when the intake system is closed.

2. The method as claimed in claim 1, comprising:
- forming a first quotient on the basis of the first absolute pressure and the atmospheric pressure;
- forming a second quotient on the basis of the second absolute pressure and the atmospheric pressure; and
- detecting whether the engine is operating below or above a predetermined load threshold on the basis of the first quotient and the second quotient.

3. The method as claimed in claim 2, further comprising the following steps when the engine is operating below the predetermined load threshold:
- forming a third quotient based on the first quotient and the second quotient; and
- determining, for a given engine speed, the cool air flow rate in the intake manifold on the basis of the predetermined characteristic straight line describing at least one linear relationship between, on the one hand, the third quotient and, on the other hand, a measured amount of cool air flowing between the throttle body and the intake system when the intake system is closed.

4. The method as claimed in claim 3, further comprising the following step, when the engine is operating above the predetermined load threshold:
- determining, for a given engine speed, the cool air flow rate in the intake manifold on the basis of a predetermined characteristic curve describing a relationship between, on the one hand, the first quotient and, on the other hand, a measured amount of cool air flowing between the throttle body and the intake system when the intake system is closed.

5. The method as claimed in claim 3, further comprising:
- selecting the first and the second predetermined crankshaft angle of rotation within a range of roughly 30 degrees for the first predetermined angle and at 180 degrees for the second predetermined angle.

6. The method as claimed in claim 2, further comprising the following step, when the engine is operating above the predetermined load threshold:
- determining, for a given engine speed, the cool air flow rate in the intake manifold on the basis of a predetermined characteristic curve describing a relationship between, on the one hand, the first quotient and, on the other hand, a measured amount of cool air flowing between the throttle body and the intake system when the intake system is closed.

7. The method as claimed in claim 6, further comprising:
- selecting the first and the second predetermined crankshaft angle of rotation within a range of roughly 30 degrees for the first predetermined angle and at 180 degrees for the second predetermined angle.

8. The method as claimed in claim 2, further comprising:
- selecting the first and the second predetermined crankshaft angle of rotation within a range of roughly 30 degrees for the first predetermined angle and at 180 degrees for the second predetermined angle.

9. The method as claimed in claim 1, further comprising:
- selecting the first and the second predetermined crankshaft angle of rotation within a range of roughly 30 degrees for the first predetermined angle and at 180 degrees for the second predetermined angle.

10. A method for improving an electronic control module intended for use with a two-stroke engine having an intake manifold located between a throttle body and an intake system, the intake manifold having a pressure sensor, comprising measuring the flow rate of cool air entering the intake manifold as claimed in claim 1.

11. An electronic control module intended for use with a two-stroke engine having an intake manifold located between a throttle body and an intake system, the intake manifold having a pressure sensor, the electronic control module being suitable for measuring the flow rate of cool air entering the intake manifold according to a method as claimed in claim 1.

12. A vehicle, that includes an electronic control module as claimed in claim 11.

13. A method of using an electronic control module with a two-stroke engine having an intake manifold located between a throttle body and an intake system, the intake manifold having a pressure sensor, the method comprising:
- using the electronic control module to measure the flow rate of cool air entering the intake manifold according to a method as claimed in claim 1; and
- detecting combustion instability in the two-stroke engine based on the measured flow rate of cool air entering the intake manifold.

14. A method of using an electronic control module with a two-stroke engine having an intake manifold located between a throttle body and an intake system, the intake manifold having a pressure sensor, the method comprising:
- using the electronic control module to measure the flow rate of cool air entering the intake manifold according to a method as claimed in claim 1; and
- determining the cool air flow rate in the manifold on the basis of information on the angle at the throttle body; and
- detecting a malfunction in the air line of a two-stroke engine based on the measured flow rate of cool air entering the intake manifold and the determined cool air flow rate in the manifold.

* * * * *